United States Patent [19]

Peake

[11] Patent Number: 4,471,107

[45] Date of Patent: Sep. 11, 1984

[54] PROCESS FOR THE PREPARTION OF VINYLPOLYSTYRYLPYRIDINE COMPOUNDS

[75] Inventor: Steven L. Peake, Ridgefield, Conn.

[73] Assignee: American Cyanamid Company, Stamford, Conn.

[21] Appl. No.: 575,094

[22] Filed: Jan. 30, 1984

[51] Int. Cl.$^3$ .................... C08G 12/08; C08G 12/26
[52] U.S. Cl. .................................... 528/248; 528/246
[58] Field of Search ............................... 528/246, 248

[56] References Cited

U.S. PATENT DOCUMENTS 4,163,740 8/1979 Malassine et al. ............. 528/248 X
4,362,860 12/1982 Ratto et al. ..................... 528/248

Primary Examiner—Lucille M. Phynes
Attorney, Agent, or Firm—M. J. Kelly; S. J. Hultquist

[57] ABSTRACT

An improved method to prepare vinylpolystyrylpyridines comprises reacting a polymethylpyridine and an aromatic dialdehyde to form a 1:1 adduct and thereafter adding a methylvinylpyridine to terminate the adduct. Vinylpolystyrylpyridines are useful as cross-linking agents in bis-imide resin matrix compositions comprising reinforcing fillers.

16 Claims, No Drawings

PROCESS FOR THE PREPARTION OF VINYLPOLYSTYRYLPYRIDINE COMPOUNDS

This invention relates to an improved process to prepare vinylpolystyrylpyridine compounds. More particularly, it relates to a two step reaction between a polymethylpyridine and an aromatic dialdehyde to form an adduct and then between the adduct and a methylvinylpyridine both steps taking place in the presence of an active anhydride.

BACKGROUND OF THE INVENTION

Bismaleimide resins are used to saturate fibrous reinforcements to form heat curable prepregs. When these are consolidated under heat and pressure, laminated shapes, useful as high strength, low weight airfoils are obtained. The prepregs however have some disadvantages, such as poor tack and drape. This has been overcome in one way by using a reactive divinyl aryl diluent for the resin, such as divinylbenzene, see, U.S. Pat. No. 4,351,932. It has also been proposed to use several divinyl nitrogen containing families of compounds for the same purpose, and these lead to laminates with unexpected additional advantages, such as increased fire resistance and increased toughness. A particularly useful group of such compounds are vinylstilbazoles derived from methyl pyridines and aromatic monoaldehydes, and they can be represented by the following general formula:

wherein $R^1$ is hydrogen, nitro, halogen, e.g., chloro, trifluoromethyl, and the like. The vinylstilbazoles have other uses, but they are particularly adapted to act as cross-linking agents for ethylenically unsaturated bis-imides. An improved process to prepare them is the subject matter of applicant's commonly assigned copending application Ser. No. 575,096, filed Jan. 30, 1984.

Another family of divinyl nitrogen compounds are the vinylpolystyrylpyridines derived from polymethylpyridines, aromatic dialdehydes and vinylmethylpyridine. These are described in U.S. Pat. No. 4,362,860 and have the typical formula $$E+AP+_{n-1}AE$$

wherein P is derived from the methylated pyridine, A is derived from the aromatic dialdehyde, E is derived from the methylvinylpyridine and n is the number of repeating units in the chain. Although the '860 patent describes the application of such compounds to a fiber or fabric to make the prepregs, a primary utility is, as has been mentioned above, in cross-linking bis maleimides in prepreg composites.

The process employed in the '860 patent to make vinylpolystyrylpyridines comprises mixing all of the three ingredients under aldol condensation conditions. This makes it difficult to control the molecular weight of the end product because of cross-linking and rapid reaction rates. Final product distribution is unpredictable and when such products are used as cross-linking agents, laminates with differing properties are ultimately obtained.

It has now been discovered that such disadvantages can be avoided and superior products are produced if the reaction is carried out in two steps: First, a polystyrylpyridine oligomer adduct (I) is generated through the reaction of a polymethylpyridine and an aromatic dialdehyde:

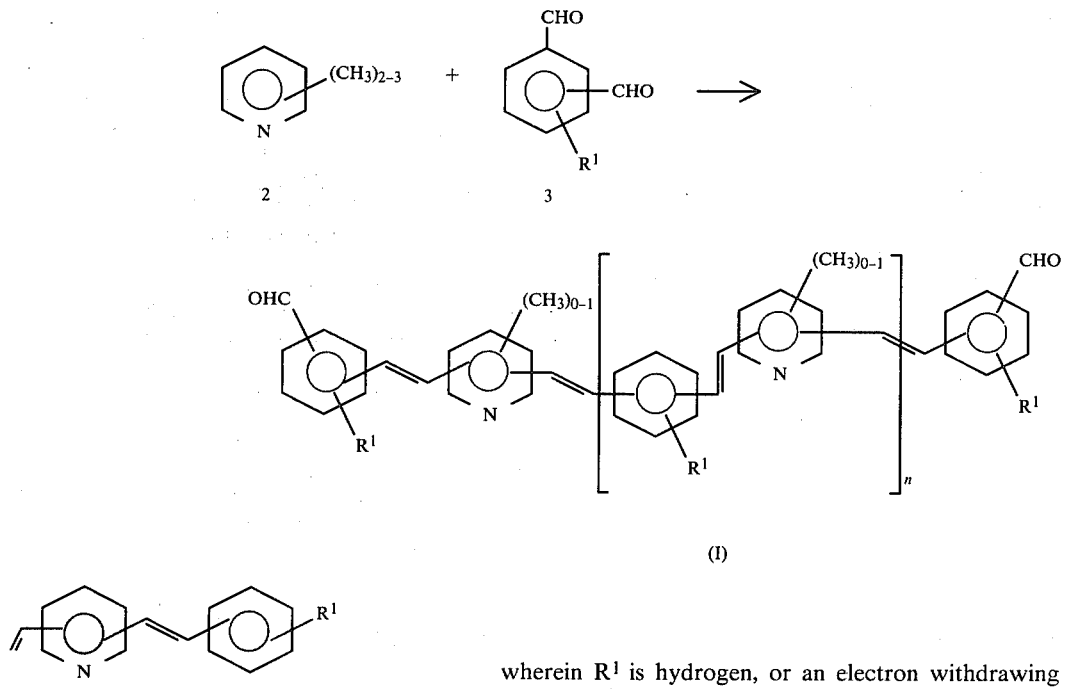

wherein $R^1$ is hydrogen, or an electron withdrawing group, such as nitro, methoxy, chloro, trifluoromethyl, and the like and n is 0 or a whole number of from 1 to about 6, usually about 2. Second, a methylvinylpyridine compound is then added to react with the terminal aldehyde groups to yield the desired product (II):

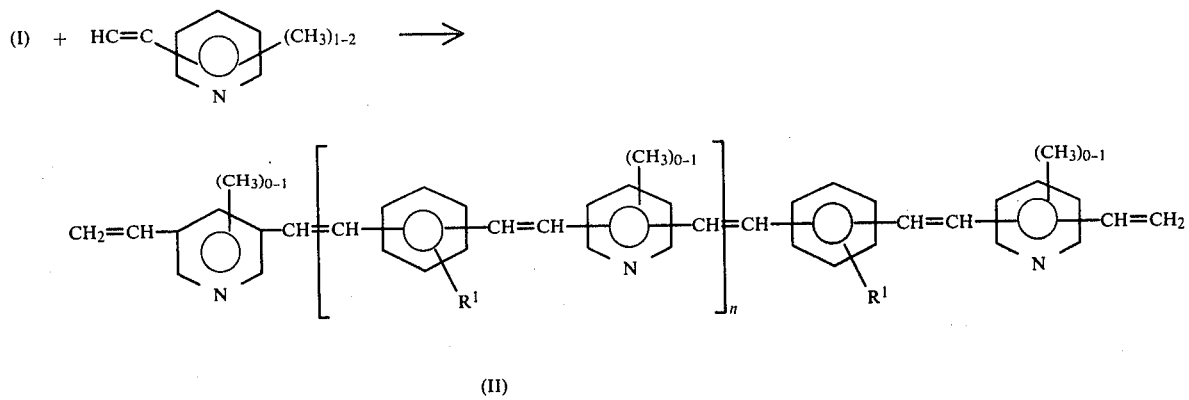

(II)

Because of the possibility of cross-linking via a third methyl group, for example if 2,4,6 trimethylpyridine is used, and because of the rapid reaction between such compounds and the aromatic dialdehydes, the timing of the addition of the methylvinylpyridine is crucial in determining the molecular weight of the final product. At least two ways of determining this are possible, one is to withdraw an aliquot of the first stage reaction mixture, cool it and determine whether or not a precipitate forms. The methylvinylpyridine should not be added until a precipitate is first noticed. This is usually 2 to 3 hours into the run. A preferred method is based on the appearance of an adduct by gas chromatographic analysis. When the ratio of this adduct, e.g., of 2,4,6-trimethylpyridine and terephthaldehyde is 4.3-4.8 by gas chromatography, the methylvinylpyridine should be added. Either method will provide reproducible molecular weights and ultimately a superior and novel product.

SUMMARY OF THE INVENTION

According to the present invention there is provided a process for the preparation of a vinylpolystyrylpyridine which comprises
  (a) reacting a polymethylatedpyridine and an aromatic dialdehyde at a temperature in the range of about 80° to about 150° C. in the presence of an active anhydride, until the ratio of a 1:1 adduct of said polymethylated pyridine and said aromatic dialdehyde is in the range of 4 to 5.5;
  (b) adding a methylvinylpyridine compound to the reaction mixture of step (a) and continuing the heating until formation of the desired vinylpolystyrylpyridine is complete; and
  (c) recovering the vinylpolystyrylpyridine.

Such a process is readily adapted to a commercially viable route to vinylpolystyrylpyridines. Because it is carried out in two stages better control of prepolymer structure and molecular weight is provided and the product is uniquely suitable as a component in resin fiber matrices.

DETAILED DESCRIPTION OF THE INVENTION

The polymethylvinylpyridines used in this invention are made in known ways and some are commercially available. Any of those disclosed in the above-mentioned U.S. Pat. No. 4,362,860 can be used. Among the illustrative compounds are di- and tri-methylpyridines such as 2,3-dimethylpyridine,
2,5-dimethylpyridine,
2,4-dimethylpyridine,
2,6-dimethylpyridine,
3,4-dimethylpyridine,
2,3,5-trimethylpyridine,
2,3,6-trimethylpyridine, and the like.

Preferred are 2,4-dimethylpyridine, 2,6-dimethylpyridine, 2,4,6-trimethylpyridine, and the like. Especially preferred is 2,4,6-trimethylpyridine.

Aromatic dialdehydes likewise can be made by procedures well known to those skilled in this art, and many are commercially available. In general, illustrative such compounds will be of the general formula

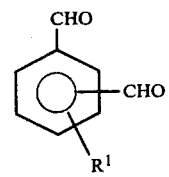

wherein $R^1$ is as defined above. Members of this family of compounds are
  terephthaldehyde,
  metaphthaldehyde,
  orthophthaldehyde,
  2-nitroterephthaldehyde,
  3-chloroterephthaldehyde,
  4-trifluoromethylorthophthaldehyde, and the like.

Preferred is terephthaldehyde. The ratio of aromatic dialdehyde to polymethylpyridine used in step (a) will be selected to cause the predominant intermediate to have carbonyl end groups. Usually this will be in the range of 1.2 to 10, preferably 1.5 to 2.5 equivalents of the dialdehyde to the polymethylpyridine.

The methylvinylpyridines used in this invention are made in known ways and some are commercially available. Among these are 2-methyl-3-vinyl pyridine and 2-methyl-5-vinyl pyridine. See, U.S. Pat. No. 4,362,860. Preferred are 5-vinyl pyridines, and especially preferred because of ready availability is 2-methyl-5-vinyl pyridine.

The term "active" anhydride is used in the sense employed in the above-mentioned U.S. Pat. No. 4,362,860. It contemplates any anhydride which effectively promotes elimination of water and condensation of the methyl group in the pyridine and the carbonyl group in the aldehyde. Illustrative are carboxylic acid anhydrides such as acetic anhydride, trifluoroacetic anhydride, propionic anhydride, and the like. Acetic anhydride is preferred. The amount of anhydride used can vary widely, but is usually in the range of 1 to 10 equivalents per equivalent of vinylpyridines, preferably 1.1 to 5.

The rate of vinylpolystyrylpyridine formation increases with increasing temperature, but the rate of polymerization of the reactants also increases. Although the reaction can be accomplished at temperatures in the range of about 80° C. to about 150° C., the best conditions seem to fall in the range of 135° to 145° C. for step (a) and 105° to 115° C. for step (b). Polymerization will not present a substantial problem if, as is preferred, an effective amount, e.g., 0.005 to 1.5 parts by weight per 100 parts by weight of product of a free radical polymerization inhibitor or mixture of such inhibitors is added prior to or during work up of the product. A catechol, such as t-butyl catechol, or an aminophenol, such as o-aminophenol, are useful, alone, or in combination. It is not essential, but is desirable to remove byproduct acid by treating the mixture of step (b) with a base, such as 50% sodium hydroxide, prior to product recovery. Preferably, ammonia (e.g., aqueous ammonia, 37% in water) will neutralize acetic anhydride and acetic acid.

The product can be recovered by any convenient method, but steam distillation is not preferred because of a tendency to promote polymerization. The solvent fractionation method of U.S. Pat. No. 4,362,860 can be used, in which an ether solution is precipitated with pentane, but it is preferred to use a method comprising dissolving the crude product in tetrahydrofuran and pouring the solution into a mixture of methanol and water preferably a 25:75 mixture. This precipitates the product and it can be freed of residual solvent by drying, e.g., at room temperature in a vacuum oven.

DESCRIPTION OF THE PREFERRED EMBODIMENTS

The following example illustrates the process of the present invention. It is not to be construed to limit the claims in any manner whatsoever.

EXAMPLE

Terephthaldehyde, 1608 parts by weight, 12.0 moles, and acetic anhydride, 2688 parts by weight, 26.4 moles, were placed in a three necked flask equipped with a nitrogen blanket, mechanical stirrer and thermometer. The contents were heated to 140° C. under nitrogen, then 2,4,6-trimethylpyridine, 968 parts by weight, 8.0 moles, were quickly added. The time was noted. After 1.5 hours and every ½ hour thereafter, aliquots were removed for gas chromatography. The crucial time was when a precipitate is observed when the aliquot is cooled to room temperature. In the gas chromatogram, major peaks are seen for 2,4,6-trimethylpyridine, terephtalaldehyde, and a later peak, the 1:1 adduct. 2-methyl-5-vinylpyridine, 1428 parts by weight, 12 moles, should be added when the area ratio of the adduct peak to terephthaldehyde is about 4.5. This time will be no more than ½ hour after a precipitate is observed in the cooled aliquot. Heating is stopped before the methylvinylpyridine addition. Cold methylvinylpyridine is added and the reaction temperature is maintained at 110° C. After 20 hours at 110° C. the flask was cooled with a water bath and 0.1% of t-butylcatechol and 0.05% of o-aminophenol, by weight, were added. The mixture was neutralized with concentrated NH₄OH at such a rate that the temperature did not exceed 75° C. The aqueous phase was removed and the organic phase was dissolved in tetrahydrofuran. The solution was filtered and added to an excess of a 75:25 mixture of water-methanol. The precipitate was filtered, squeezed dry, then dried to a constant weight in a room temperature vacuum oven. The yield was 2,200 parts by weight, 71% of theoretical.

By gas chromatographic analysis, 7.5 wt.% of 2-methyl-5-vinylpyridine was present. The melting point by differential scanning calorimetry was 75°–129° C. with a maximum of 99° C.

The above-mentioned patents are incorporated herein by reference. Obviously, many variations of the present process will suggest themselves to those skilled in this art in light of the above, detailed description. For example, instead of 2-methyl-5-vinyl pyridine, 2-methyl-3-vinyl pyridine can be used. Instead of 2,4,6-trimethylpyridine, 2,4-dimethylpyridine and 2,6-dimethyl pyridine can be used. Instead of terephaldehyde, orthophalaldehyde can be used. Instead of acetic anhydride, propionic anhydride can be used. A viscosity measure of endpoint can be used instead of precipitate formation and/or gas chromatography. All such variations are within the full intended scope of the appended claims.

I claim:

1. A process for the preparation of a vinylpolystyrylpyridine which comprises
   (a) reacting a polymethylatedpyridine and an aromatic dialdehyde at a temperature in the range of about 80° to about 150° C. in the presence of an active anhydride, until the ratio of a 1:1 adduct of said polymethylated pyridine and said aromatic dialdehyde is in the range of 4 to 5.5;
   (b) adding a methylvinylpyridine compound to the reaction mixture of step (a) and continuing the heating until formation of the desired vinylpolystyrylpyridine is complete; and
   (c) recovering the vinylpolystyrylpyridine.

2. A process as defined in claim 1 including the step of adding an effective amount of a free radical polymerization inhibitor or mixture of such inhibitors to the product of step (b) before recovering the vinylstyrylpyridine in step (c).

3. A process as defined in claim 1 wherein formation of the 1:1 adduct in step (a) is followed by cooling an aliquot of the reaction mixture to about 25° to 30° C. and deeming the end of step (a) to be the point at which a precipitate is first observed.

4. A process as defined in claim 1 wherein formation of the 1:1 adduct in step (a) is followed by analyzing an aliquot of the reaction mixture by gas chromatography, measuring the ratio of the adduct to unreacted aromatic dialdehyde and deeming the end of step (a) to be the point at which the ratio of the adduct to the aromatic dialdehyde is in the range of from about 4.0 to about 5.0.

5. A process as defined in claim 1 wherein said polymethylated pyridine is selected from 2,4-dimethylpyridine, 2,6-dimethylpyridine, 2,4,6-trimethylpyridine, or a mixture of any of the foregoing.

6. A process as defined in claim 5 wherein said polymethylpyridine comprises 2,4,6-trimethylpyridine.

7. A process as defined in claim 1 wherein said aromatic dialdehyde is of the formula

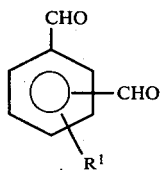

wherein R¹ is selected from —H, —NO₂, —Cl or —CF₃.

8. A process as defined in claim 7 wherein said aromatic dialdehyde is terephthaldehyde.

9. A process as defined in claim 1 wherein said methylvinylpyridine is a 5-vinylpyridine.

10. A process as defined in claim 9 wherein said 5-vinylpyridine is 2-methyl-5-vinylpyridine.

11. A process as defined in claim 1 wherein said active anhydride is acetic anhydride.

12. A process as defined in claim 1 wherein step (a) is carried out in the range of from about 135° to about 145° C., and step (b) is carried out in the range of from about 105° to about 115° C.

13. A process as defined in claim 1 including the step of neutralizing the reaction mixture of step (b) with a base prior to recovering the product.

14. A process as defined in claim 13 wherein the base comprises ammonia.

15. A process as defined in claim 1 wherein recovery step (c) is carried out by solvent-fractionation.

16. A process as defined in claim 15 wherein solvent fractionation is carried out with tetrahydrofuran as the solvent and a mixture of water and methanol as the antisolvent.

* * * * *